United States Patent
Hymel et al.

(10) Patent No.: US 8,990,955 B2
(45) Date of Patent: Mar. 24, 2015

(54) CONTROLLING ACCESS TO A SHARED FILE

(75) Inventors: James Allen Hymel, Kitchener (CA);
Janine Mary Hodder, Waterloo (CA);
Jean Philippe Bouchard, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/564,560

(22) Filed: Aug. 1, 2012

(65) Prior Publication Data

US 2014/0041044 A1 Feb. 6, 2014

(51) Int. Cl.
*G06F 17/30* (2006.01)
*G06F 11/30* (2006.01)
*G06F 7/04* (2006.01)
*H04L 29/06* (2006.01)

(52) U.S. Cl.
USPC ............ 726/27; 713/150; 713/166; 713/189; 713/193; 726/1

(58) Field of Classification Search
CPC .............. H04L 69/28; H04L 61/2553; H04L 29/12471; H04L 67/145; H04W 76/045
See application file for complete search history.

(56) References Cited

U.S. PATENT DOCUMENTS

| | | | | |
|---|---|---|---|---|
| 7,277,549 B2 * | 10/2007 | Olkin et al. | | 380/277 |
| 8,417,935 B2 * | 4/2013 | Bettger et al. | | 713/150 |
| 2004/0025052 A1 * | 2/2004 | Dickenson | | 713/201 |
| 2005/0015461 A1 * | 1/2005 | Richard et al. | | 709/217 |
| 2006/0129627 A1 * | 6/2006 | Phillips et al. | | 709/200 |
| 2007/0255822 A1 * | 11/2007 | Thiel et al. | | 709/224 |
| 2010/0107213 A1 * | 4/2010 | Ureche et al. | | 726/1 |
| 2010/0278101 A1 * | 11/2010 | Bengtsson et al. | | 370/328 |
| 2011/0246654 A1 * | 10/2011 | Koenig et al. | | 709/227 |
| 2012/0042394 A1 * | 2/2012 | Jakobson | | 726/29 |
| 2012/0166593 A1 * | 6/2012 | Yoon et al. | | 709/219 |
| 2012/0230329 A1 * | 9/2012 | Morris | | 370/389 |
| 2013/0018977 A1 * | 1/2013 | Peng | | 709/213 |
| 2013/0225078 A1 | 8/2013 | Johansson et al. | | |

OTHER PUBLICATIONS

Greiler, Michaela, "Secure Resource Sharing in Ad hoc Networks," In Proceedings of the International Conference on Security and Management 2008, pp. 278-284, retrieved from http://swerl.tudelft.nl/twiki/pub/MichaelaGreiler/WebHome/SAM4540.pdf.

Syncplicity Cloud Collaboration, "Introducing Syncplicity Group Sharing and Permissions," Apr. 26, 2012, retrieved from http://blog.syncplicity.com/blog/cloud-collaboration/.

(Continued)

*Primary Examiner* — Dede Zecher
*Assistant Examiner* — Trang Doan
(74) *Attorney, Agent, or Firm* — Hanley, Flight & Zimmerman LLC

(57) ABSTRACT

A shared data store may be accessible to a plurality of electronic devices and used to share files in a collaboration setting. A shared file is shared by a first electronic device with a second device via a connection between the first electronic device and the shared data store. A coordinating electronic device associated with the shared data store monitors the connection with the first electronic device. If a loss in the connection is detected, the coordinating electronic device may cause access to the shared file to become restricted to the second electronic device responsive to the loss of the connection.

16 Claims, 6 Drawing Sheets

(56) References Cited

OTHER PUBLICATIONS

Greiler et al., "Secure Resource Sharing in Ad hoc Networks," System Security, University Klagenfurt, Klagenfurt, Austria, in proceeding of: Proceedings of the 2008 International Conference on Security & Management, SAM 2008, Las Vegas, Nevada, USA, Jul. 14-17, 2008, 7 pages.

Schultz, Jeff, Syncplicity Blog, Cloud Collaboration, accessed at <http://blog.syncplicity.com/blog/cloud-collaboration/> on Jul. 6, 2012, 16 pages.

Dropbox, "How do I share folders with other people?," accessed at <https://www.dropbox.com/help/19/en>, Sep. 11, 2012, 4 pages.

Carolyn H., "Design Foresights: Imagining new ways to work, play and create," accessed at <http://blogs.blackberry.com/2012/02/design-foresights-concept-demo-videos-pitchrocket-and-confetti/>, Feb. 28, 2012, 1 page.

Filonenko et al., "Investigating Ultrasonic Positioning on Mobile Phones," Conference papers, Digital Media Centre, Dublin Institute of Technology, Sep. 1, 2010, 10 pages.

* cited by examiner

CONTROLLING ACCESS TO A SHARED FILE

TECHNICAL FIELD

The present disclosure relates generally to file sharing between devices, and in particular, to access to a shared file in a peer-sharing environment.

BACKGROUND

Electronic devices may allow for the creation and storage of files. Such files include documents, presentations, pictures, movies, and many others. The files may be created by a user of the electronic device, or generated automatically by the electronic device.

Electronic devices such as cellular telephones (mobile phones), smart telephones (smartphones), Personal Digital Assistants (PDAs), computers, or tablet computers have become widespread. Electronic devices may be equipped with communications components or subsystems that allow for the transmission of files between two or more electronic devices; and therefore allow for easy sharing of files between electronic devices. However, information contained within particular files is at times considered sensitive, and as such it is desirable to control access to particular files.

BRIEF DESCRIPTION OF THE DRAWINGS

Reference will now be made to the accompanying drawings showing example embodiments of the present application, and in which.

DETAILED DESCRIPTION OF EXAMPLE EMBODIMENTS

Figure 1:
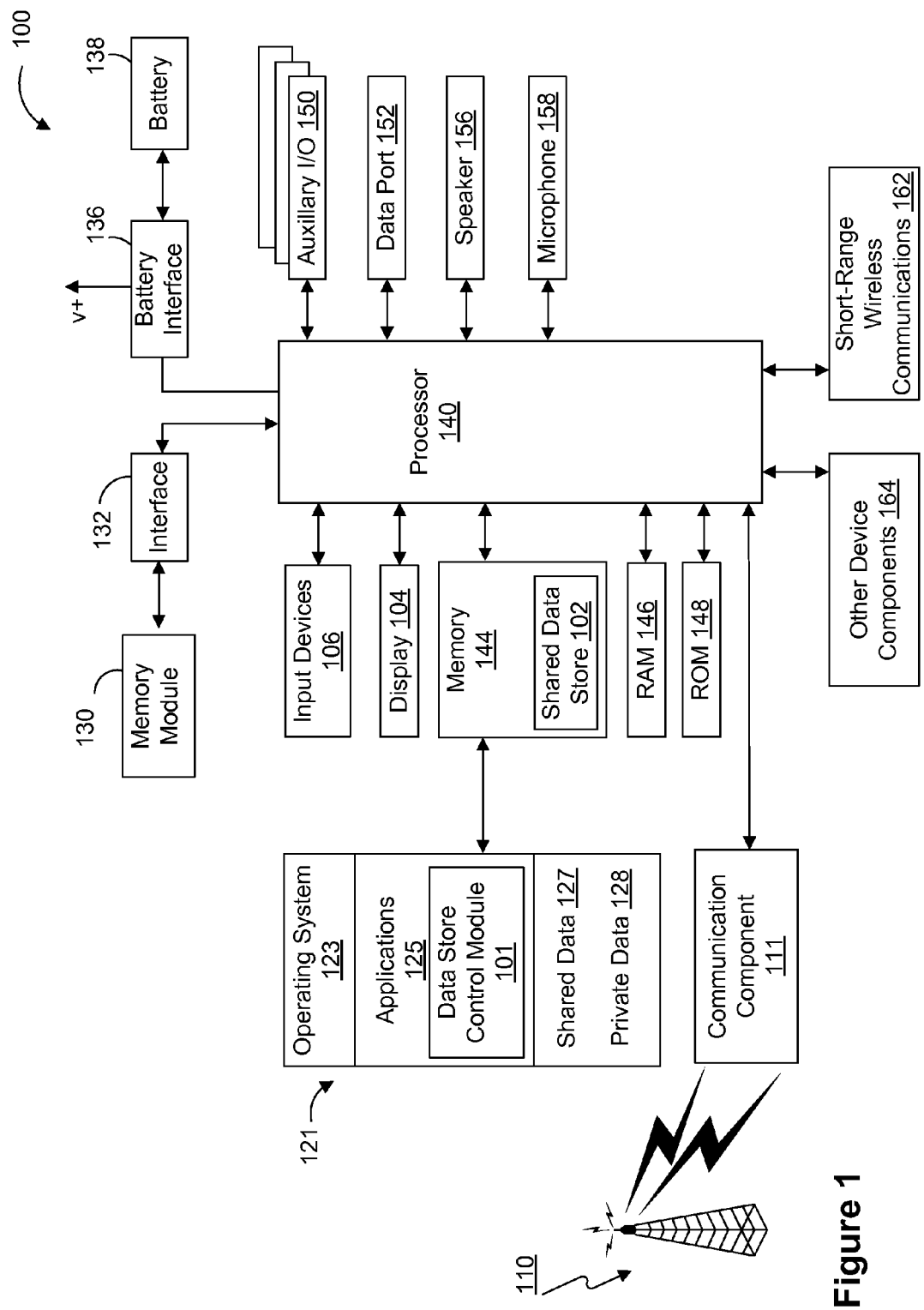
FIG. 1 shows a block diagram illustrating an electronic device in accordance with an example embodiment.

The detailed description provided below describes example embodiments for controlling access to a shared file. A file may be shared by a first device (e.g. sharing device) to a second device (e.g. accessing device). The file may be shared directly, such as by a peer-to-peer connection or via a file sharing server that manages the sharing of files between related devices. In one example the devices may be part of a collaborative file-sharing environment. Access to a shared file may be controlled based upon a state of a connection between the sharing device and either the accessing device or the file sharing server. The term access to a shared file refers to the ability for a device to open and/or edit the shared file, and may also be referred to as accessibility, file access, privileges, permissions, or other terms which reflect on whether a device may open and/or edit the shared file.

In the embodiments below, a shared data store may be accessible via a communications connection to a plurality of other electronic devices. A connection between two or more electronic devices is established when they have a communication path (e.g. a serial or parallel connection, or over a wireless network or wired network, or a peer-to-peer connection) to each other and have formed a communication session over the connection. One electronic device may initiate the connection by identifying a second electronic device to communicate to, for example, by use of an IP address or a user account. The communication session includes transmissions which are sent from the sender and received by the receiver. When transmissions are not received, the sender or the receiver may determine that the connection has been lost.

In one example embodiment, a file is received at the shared data store from a first electronic device (e.g. sharing device), via a connection between the shared data store and the first electronic device. For example, the first electronic device may be configured to share the file with the shared data store such that one or more of the plurality of electronic devices are able to access the shared filed at the shared data store. The shared data store may monitor the connection with the first electronic device that originally shared the file. If a loss in the connection is detected, the shared data store may alter (e.g. restrict or modify) the capability of the other electronic devices to access the shared file. For example, restricting access to the shared file based upon a loss in the connection with the sharing device ensures that no un-authorized access is granted to the file. It should be understood that the shared data store described herein may be implemented at a file sharing server, a centralized service, or an electronic device, including the sharing device.

Restricting access to the file can be performed in a number of ways, including setting the permissions of the file to read-only; encrypting the file; or deleting the file.

In some embodiments, when a new connection is reestablished between the first electronic device and the shared data store after the previous loss of connection access to the file is reinstated at the shared data store in response to detecting the new connection.

Reinstating access to the file can be performed in a number of ways, including setting the permissions of the file to read-and-write; or decrypting the file.

The following description refers to the accompanying drawings. Wherever possible, the same reference numbers are used in the drawings and the following description to refer to the same or similar parts. While several example embodiments are described herein, modifications, adaptations, and other implementations are possible. For example, substitutions, additions, or modifications can be made to the components illustrated in the drawings, and the example methods described herein can be modified by substituting, reordering, or adding steps to the disclosed methods. Accordingly, the foregoing general description and the following detailed description are non-limiting examples.

In addition, numerous specific details are set forth in order to provide a thorough understanding of the example embodiments described herein. It will, however, be understood by those of ordinary skill in the art that the example embodiments described herein can be practiced without these specific details. Furthermore, well-known methods, procedures, and components have not been described in detail so as not to obscure the example embodiments described herein.

Reference is now made to FIG. 1 which illustrates in detail electronic device 100 in which example embodiments can be applied. In some embodiments, the electronic device may include a communication component 111 that facilitates wired communication, for example, for a server computer. The electronic device may optionally include a battery interface 136, battery 138, and/or an external power source (not shown).

In one embodiment, electronic device 100 is a two-way communication mobile device having data and voice communication capabilities, and the capability to communicate with other computer systems, for example, via the Internet. In various embodiments electronic device 100 can be a handheld device, a multiple-mode communication device configured for data and voice communication, a smartphone, a mobile telephone, a netbook, a gaming console, a tablet, or a PDA (personal digital assistant).

Electronic device 100 may include a housing (not shown) containing the components of electronic device 100. The internal components of electronic device 100 can, for example, be constructed on a printed circuit board (PCB). The description of electronic device 100 herein mentions a number of specific components and subsystems. Although these components and subsystems can be realized as discrete elements, the functions of the components and subsystems can also be realized by integrating, combining, or packaging one or more elements in any suitable fashion.

Electronic device 100 may include a controller comprising at least one processor 140 (such as a microprocessor), which controls the overall operation of electronic device 100. Processor 140 may interact with device components such as communication component 111 for exchanging radio frequency signals with the wireless network (for example WAN and/or PLMN) to perform communication functions.

Communication component 111 may include one or more communication components for communicating with wireless WAN, wireless access points, or short range wireless endpoints within the wireless network.

Processor 140 operates under stored program control and executes software modules 121 stored in memory such as memory 144 or ROM 148. For example, processor 140 may execute non-transitory computer readable instructions stored in memory. ROM 148 can contain data, program instructions, or both. Memory 144 can contain data, program instructions, or both. In some embodiments, memory 144 is rewritable under control of processor 140, and can be realized using any appropriate memory technology, including RAM, EEPROM, EAROM, FLASH, and the like. As illustrated in FIG. 1, software modules 121 can include operating system software 123. Additionally, software modules 121 can include software applications 125.

In some embodiments, memory 144 may store shared data 127 for sharing, for example, in shared data store 102. In some embodiments, the entire storage space provided by the memory 144 will be part of a shared data store, such as shared data store 102. In other embodiments, only a portion of the storage space provided by the memory 144 will be part of the shared data store 102. As an example, the shared data store 102 may be implemented in a sandboxed environment, to help ensure that other data, such as private data 128 stored on the memory 144 is not shared unintentionally.

Software modules 121, such as data store control module 101, or parts thereof can be temporarily loaded into volatile memory such as RAM 146. RAM 146 is used for storing runtime data variables and other types of data or information.

In some embodiments, different assignment of functions to the types of memory could also be used. In some embodiments, software modules 121 can include a data store control module 101.

In some embodiments, electronic device 100 also includes one or more removable memory modules 130 (typically comprising FLASH memory) and one or more memory module interfaces 132. Among possible functions of removable memory module 130 is to store information used to identify or authenticate a user or the user's account to wireless network (for example WAN and/or PLMN). For example, in conjunction with certain types of wireless networks, including GSM and successor networks, removable memory module 130 is referred to as a Subscriber Identity Module (SIM). Memory module 130 is inserted in or coupled to memory module interface 132 of electronic device 100 in order to operate in conjunction with the wireless network.

Electronic device 100 also includes a battery 138 which furnishes energy for operating electronic device 100. Battery 138 can be coupled to the electrical circuitry of electronic device 100 through a battery interface 136, which can manage such functions as charging battery 138 from an external power source (not shown) and the distribution of energy to various loads within or coupled to electronic device 100. Short-range communication component 162 is an additional optional component that provides for communication between electronic device 100 and different systems or devices, which need not necessarily be similar devices. For example, short-range communication component 162 can include an infrared device and associated circuits and components, or a wireless bus protocol compliant communication device such as a BLUETOOTH® communication module to provide for communication with similarly-enabled systems and devices.

A predetermined set of applications that control basic device operations, including data and possibly voice communication applications can be installed on electronic device 100 during or after manufacture. Additional applications and/or upgrades to operating system software 123 or software applications 125 can also be loaded onto electronic device 100 through the wireless network (for example WAN and/or PLMN), auxiliary I/O subsystem 150, data port 252, short-range communication component 162, or other suitable component such as 164. The downloaded programs or code modules can be permanently installed, for example, written into the program memory (for example memory 144), or written into and executed from RAM 146 for execution by processor 140 at runtime.

Controlling access to the file, or files, associated with a disconnected device ensures that data stored in the file is kept safe. For example, when a user of a device is in a meeting with a client or a vendor, it is often useful to share files, for example, to allow for simultaneous viewing and collaboration. However, in such settings there may also be concern over data security about a shared file after the meeting is over. Controlling access to shared files may help to reduce security concerns. In accordance with this disclosure, an owner or stakeholder of a particular file may share the file with any number of persons, over a number of electronic devices in a collaboration setting. Once the collaboration setting has come to an end, the owner or stakeholder of the file is able to disconnect from the collaboration setting and the files that they had contributed will become restricted even if copies of the files were shared via a shared data store. Various levels of restriction of the files can be applied, and may include deletion, encryption, or changing permissions of the file, such as making the file read-only or otherwise locked. Additional methods of restricting access to a shared file may also be employed for the same purpose. In this disclosure, the term restricting access may also be referred to as modifying, controlling, altering, or other terms that indicate a change that reduces or prevents access to a particular file.

The level of restriction applied can vary, as discussed. In some embodiments, the level of restriction to be applied to each shared file may be different for each accessing device. This determination, in one embodiment, may be based on a device management policy present on the accessing device. In another embodiment, this determination may be based on a device management policy present on the sharing device which is providing the shared file. Also, a combination of both policies may be applied. For example, if no device management policy is present on one of the accessing devices, then that particular device may be considered insecure, and the shared file is restricted, deleted or otherwise made inaccessible. In another example, a device management policy is present on one of the accessing devices; however, this policy is from a company that is different from the company associated with the sharing device providing the shared file, and as such, the shared file may also be restricted, deleted or otherwise made inaccessible. In another example, policies are present on the sharing device and accessing device. For example the policies may match each other or may have originated from the same company, in which case a low level of restriction (e.g. changing permission of file to read-only) or no restriction may be employed.

The device management policy associated with the accessing device may be examined for particular security features, such as the ability to remotely wipe shared data stored on the device, or mandatory encryption of data stored on the device. In some embodiments, the more security features enabled by the policy, the lower the level of restriction that may be used when the sharing device connection has been lost.

Furthermore, in some embodiments, when the sharing device is reconnected, access to the file or files previously shared by the sharing device is reinstated. For example if the same two devices are in a new collaboration setting, it is useful for the same two devices to have access to previously shared files once the collaboration connection is established. If the previously shared files have been deleted, then the files may be once again replicated to the shared data store. Additionally, reinstating access to the files may include any of decrypting, or changing permissions of the file. Addition methods of reinstating access to a shared file may also be employed for the same purpose, dependant on the method used to restrict access to the file.

Reference is now made to FIGS. 2a, 2b and FIGS. 3a, 3b and FIGS. 4a, 4b. Various file sharing example environments are shown in a block diagram representation. It should be understood that the example environments described in FIGS. 2a, 2b, 3a, 3b, 4a, 4b are only examples and further example environments may be easily conceived by persons of skill in the relevant art. Furthermore, the examples described in these figures may be used in combination with each other, such as a mixed file sharing environment in which some files are shared via peer-to-peer and other files are shared via a centralized storage server. The electronic devices (20, 22, 30, 32, 34, 40, 42, and 44) and the data server 46 are example electronic devices used for illustration purposes, and are similar to electronic device 100 detailed in FIG. 1. The electronic devices are able to communicate with one another by use of wireless or wired communications components, such as 111. In some embodiments, one of the electronic devices may also maintain a shared data store which is used to facilitate sharing of files among a plurality of electronic devices.

Figure 2A:
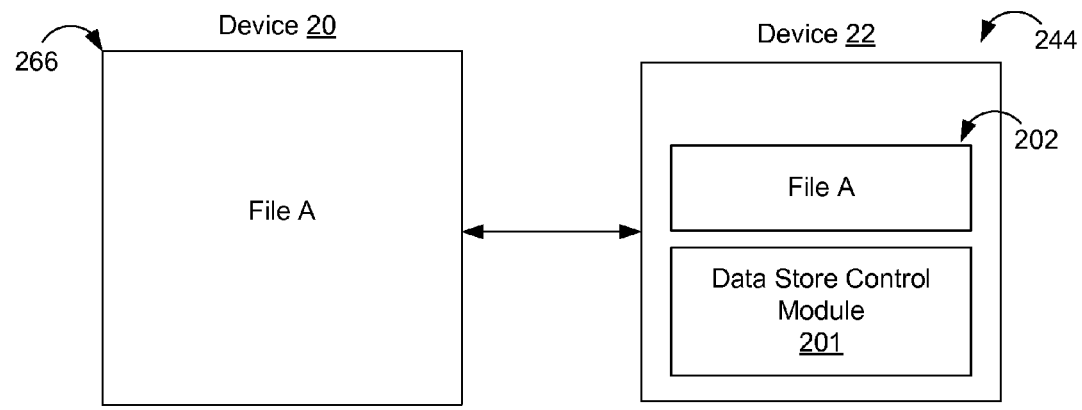
FIG. 2a shows a peer-to-peer file sharing example environment in a block diagram representation.

FIG. 2a illustrates two devices, connected to one another in a peer-to-peer (P2P) session. Device 20 having memory 226 is the owner of file A and is sharing file A with device 22, having memory 244, via an established connection over the P2P session. In this example, device 22 receives a copy of file A and stores the copy of file A in memory 244. Memory 266 and memory 244 may be substantially similar to memory 144 described in FIG. 1. In one embodiment, device 22 maintains a shared data store 202, which is used to store the copy of file A. For example, the shared data store 202 may be made accessible to device 20 and device 22 such that they can collaborate on a working copy of file A simultaneously. Device 22 may be a coordinating electronic device as described in this disclosure.

Figure 2B:
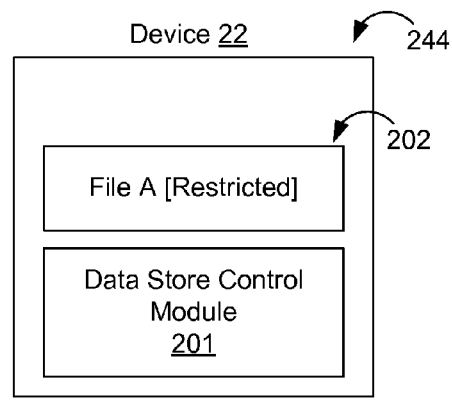
FIG. 2b shows a file sharing example environment, after having detected a loss of connection to a peer device, in a block diagram representation.

A data store control module 201 present on device 22 monitors for a loss of connection between device 20 and device 22. When a loss of connection is detected, as illustrated in FIG. 2b, the data store control module 201 will restrict access to file A to device 22. In some embodiments, the data store control module 201 will alter the permissions of file A, such that file A is read-only; i.e. file A cannot be edited by device 22. In another embodiment, the data store control module 201 will encrypt file A, such that it cannot be read by device 22. In yet another embodiment, data store control module 201 will delete file A from the shared data store 202.

In some embodiments, data store control module 201 will determine if a device management policy is present on device 22. If a device management policy is present, then the data store control module 201 may determine whether to restrict access to file A based on the device management policy. For example, if the device management policy on device 22 is one such that device 22 is authorized to maintain full access to the file, full access is maintained by data store control module 201.

Figure 3A:
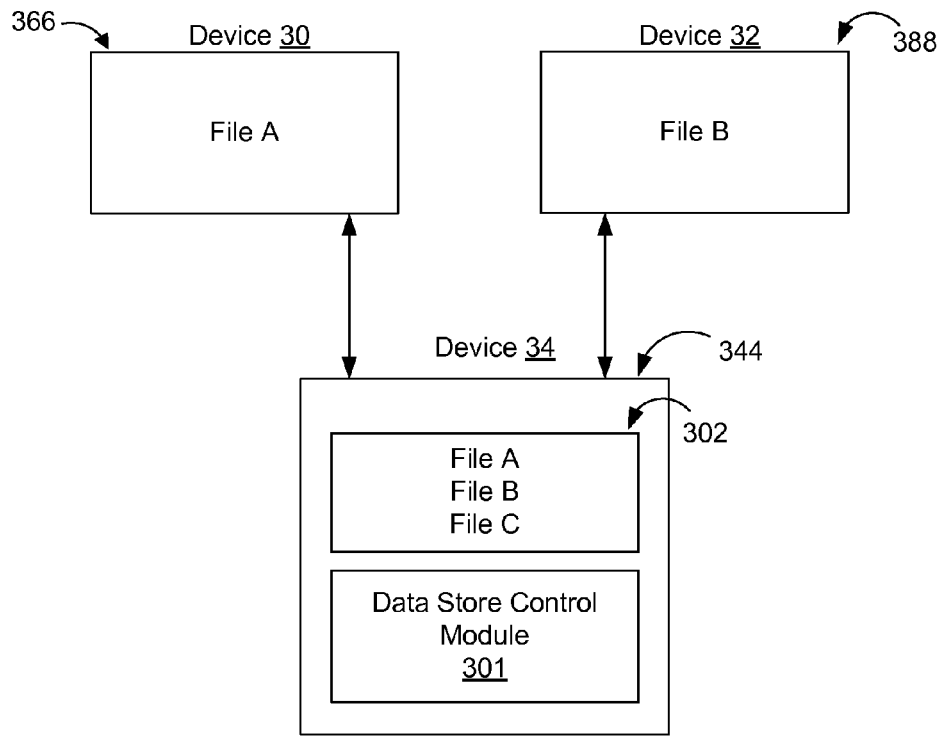
FIG. 3a shows a file sharing example environment in a block diagram representation.

In another embodiment, illustrated in FIG. 3a, a plurality of devices may participate in a networked configuration. In FIG. 3a, device 34 acts as a file host for the devices participating in a collaboration setting. As illustrated, file A is stored on memory 366 associated with device 30, and is shared by device 30 via an established connection. File B is stored on memory 388 associated with device 32, and is shared by device 32 via an established connection. Memory 366 and memory 388 may be substantially similar to memory 144 described in FIG. 1.

Device 34 stores copies of files A and B in memory 344 associated with device 34, and more particularly in the shared data store 302. Memory 344 may be substantially similar to memory 144 described in FIG. 1. Device 34 also shares file C, by placing it in the share data store 302. In this embodiment, device 34 both maintains a shared data store 302, and makes the shared data store 302 accessible to device 30 and device 32. Files A, B and C are thus now accessible to device 30, device 32, and device 34 simultaneously; allowing each device to access the file as needed. Device 34 may be a coordinating electronic device as described in this disclosure.

Figure 3B:
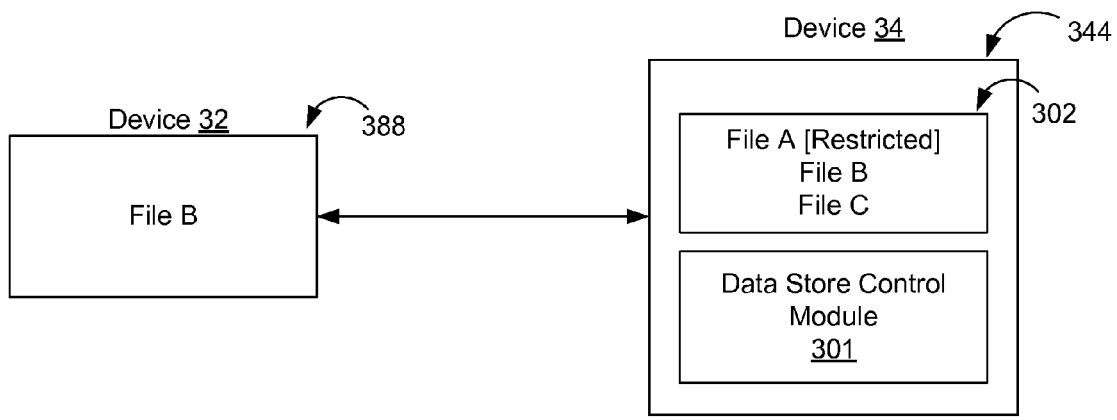
FIG. 3b shows a file sharing example environment, after having detected a loss of connection to one of a group of devices, in a block diagram representation.

A data store control module 301 present on device 34 monitors for a loss of connection between device 30 and device 32, and between device 32 and device 34. When a loss of connection is detected, as illustrated in FIG. 3b, the data store control module 301 will restrict access to the file associated with the disconnected device. For example, when device 30 is disconnected, the data store control module 301 will restrict access to file A. Similarly, when device 32 is disconnected, the data store control module 301 will restrict access to file B.

In some embodiments, data store control module 301 present on device 34 will first determine if a device management policy is present on each of the connected devices, prior to restricting access to each file. For example, if the device management policy on device 32 is one such that device 32 is authorized to maintain full access to file A, full access is maintained by data store control module 301. At the same time, the device management policy on device 30 may not be sufficient to allow access to file B after device 32 has been disconnected. The data store control module 301 present on device 34 will therefore restrict access to file B to device 30 when device 32 is determined to be disconnected.

Figure 4A:
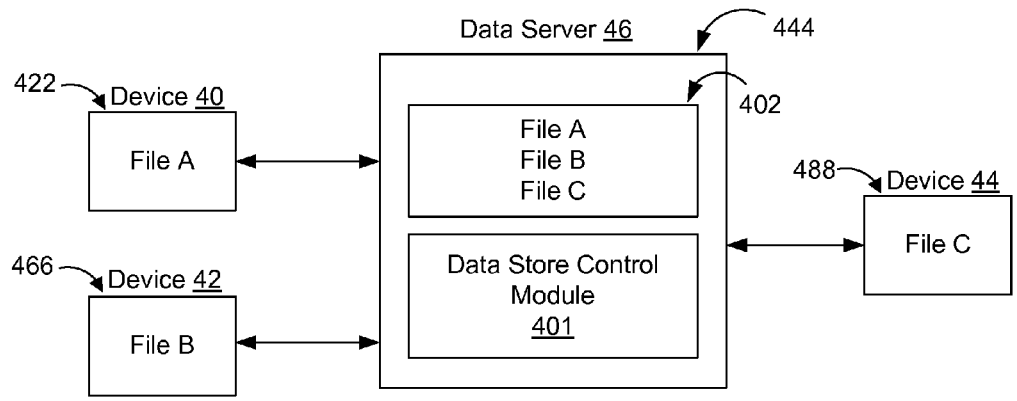
FIG. 4a shows a server based file sharing example environment in a block diagram representation.

In yet another embodiment, illustrated in FIG. 4*a*, a plurality of devices have each established a connection with a data server 46. The data server 46, is for example, accessible over a Wide Area Network (WAN), and may be provided by a third-party. In some embodiments, the data server 46 is a local device, accessible using a serial cable, or over an Internet Packet (IP) based wired connection, or over a wireless connection such a WLAN. In some embodiments, the data server 46 is compliant with a Digital Living Network Alliance (DLNA) standard for data sharing.

Device 40 sends file A stored on memory 422 to the data server 46, device 42 sends file B stored on memory 466 to the data server 46, and device 44 sends file C stored on memory 488 to the data server 46. The data server 46 stores copies of files A, B, and C in memory 444 associated with the data server 46, and more particularly in the shared data store 402. Memory 444 may be substantially similar to memory 144 described in FIG. 1. The three files are made accessible to all three devices 40, 42, and 44. In some embodiments, only one device shares files to the shared data store 402 on the data server 46.

Figure 4B:
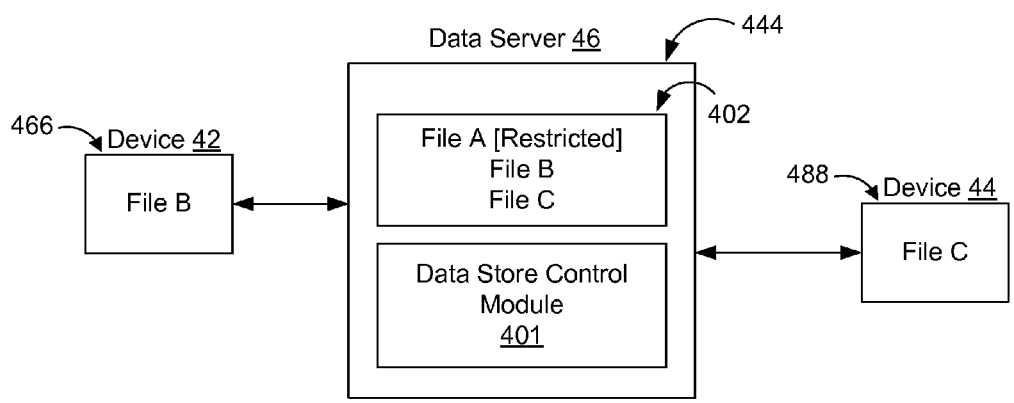
FIG. 4b shows a server based file sharing example environment, after having detected a loss of connection to a file-sharing device, in a block diagram representation.

A data store control module 401 present on the data server 46 monitors for a loss of connection between each of device 40, device 42, and device 44 and the data server 46. When a loss of connection is detected, as illustrated in FIG. 4*b*, the data store control module 401 will restrict access to the file associated with the disconnected device. For example, when device 40 is disconnected, the data store control module 401 will restrict access to file A. Similarly, when device 42 is disconnected, the data store control module 401 will restrict access to file B. Data server 46 may be a coordinating electronic device as described in this disclosure. In some embodiments, restricting access to the files will be dependent on any device management policy present on each of the three devices.

In an alternate embodiment, data store control module 401 on the coordinating electronic device (e.g. data server 46) may monitor for a loss of connection between a first collaborating device (e.g. device 40) and a second collaborating device (e.g. device 42) and modify access to the shared file based on the state of the connection between the first and second collaborating devices.

Figure 5:
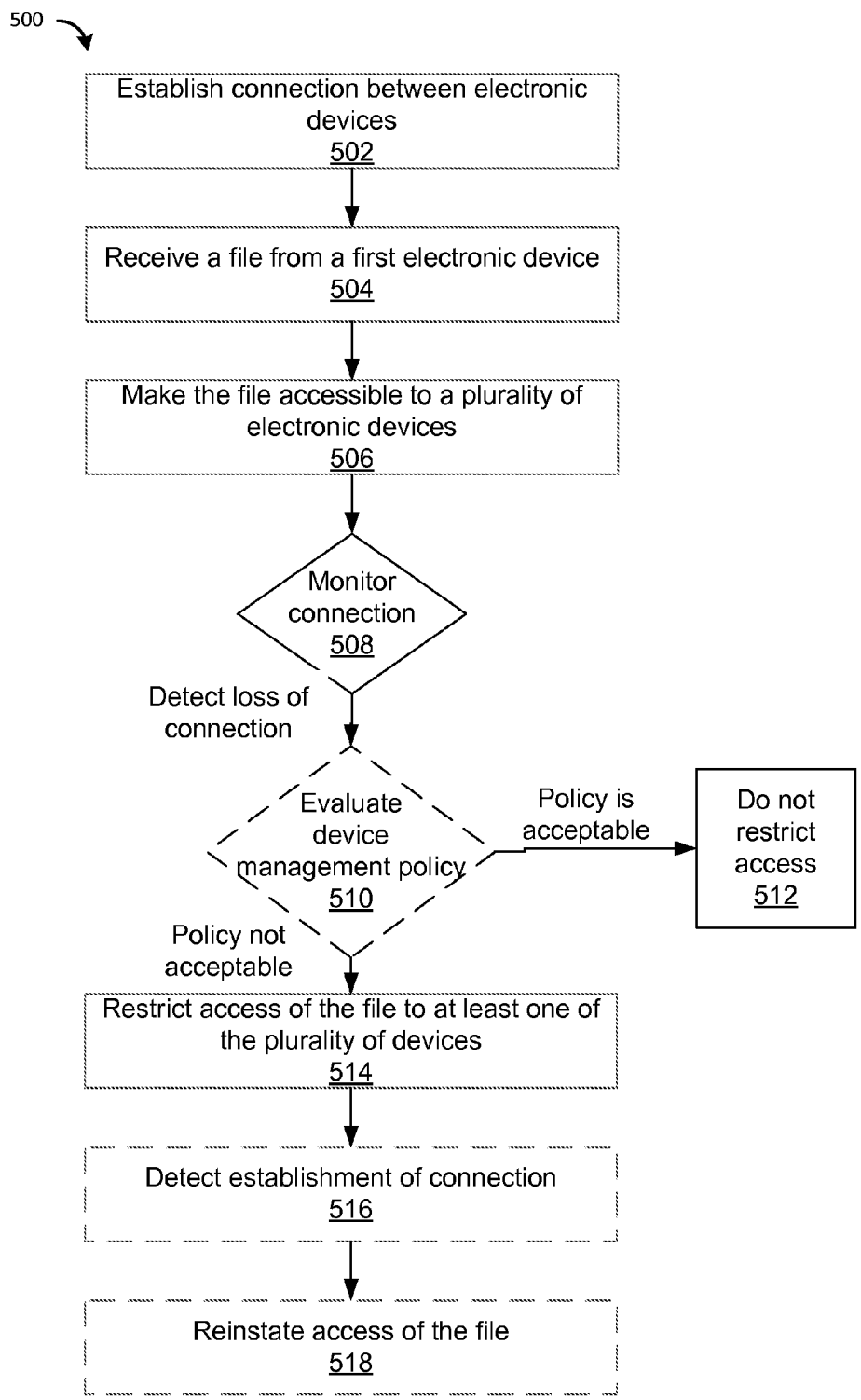
FIG. 5 is a flow chart illustrating an example method performed by a device having a data store for restricting and reinstating access to a shared file.

Reference will now be made to FIG. 5, showing a flow chart illustrating an example method 500 performed by a coordinating electronic device having a shared data store accessible to a plurality of electronic devices for restricting and optionally reinstating access to a shared file. The coordinating electronic device is able to coordinate, synchronize, manage, or otherwise facilitate the sharing of files among a plurality of electronic devices having a connection with the coordinating electronic device in accordance with this disclosure. In some embodiments, the coordinating electronic device may also be a sharing device that is providing a shared file.

At step 502, a connection is established between a first electronic device and the coordinating electronic device. The first electronic device has a file that is designated for sharing (e.g. "shared file") with at least one of a plurality of electronic devices that have connections with the coordinating electronic device. A connection may be established via wired or wireless communication, using one of many known communication protocols, such as a protocol from the internet protocol suite, e.g. Transmission Control Protocol (TCP) and Internet Protocol (IP), or alternatively over a serial communication protocol. When a connection is maintained, for example, by exchanging a "keep-alive" packet over TCP between the two devices, the connection may be referred to as a persistent connection. A persistent connection is used so that the connection is not dropped even if no data is exchanged between the two devices over a time period greater than a timeout period defined by the protocol. In accordance with the embodiments described herein, a persistent connection may also allow for the coordinating electronic device to determine when the connection is lost, for example when a "keep-alive" packet (request or response) is expected but is not received by the coordinating electronic device.

If the shared file is not already stored at the shared data store, then the shared file is sent from the first electronic device via the connection, and at step 504 is received at the coordinating electronic device for storage in the shared data store. At step 506, the shared file is made accessible to at least one of the plurality of electronic devices.

At step 508, the coordinating electronic device monitors the connection between the first electronic device and the coordinating electronic device for any loss of connection. In some embodiments, step 508 may be performed by a data store control module or connection management agent at the coordinating electronic device. A loss of connection can be detected by a variety of methods. In one embodiment, the first electronic device sends a data packet to the coordinating electronic device indicating a pending request to close the connection. In another embodiment, the coordinating electronic device will send a data packet to the first electronic device, and request that the first electronic device respond. This can be implemented by the use of the echo command in the TCP protocol. In another embodiment, the two devices are connected by a serial cable; the coordinating electronic device monitors the current or resistance at the connection port. Other alternate implementations may also accomplish the same. Method 500 remains at step 508 until a loss of connection is detected.

When a loss of connection between the first electronic device and the coordinating electronic device is detected, method 500 proceeds to optional step 510 or to step 514. At optional step 510, the coordinating electronic device (e.g. a data store control module of the coordinating electronic device) determines if a device management policy is present on each of the plurality of electronic devices that have access to the shared file. This can be implemented, for example, by exchanging data packets between the coordinating electronic device and each of the plurality of the electronic devices. In some embodiments, the device management policy data may be exchanged as soon as the connection is established between each of the two devices. If a device management policy is present, further information regarding the rules present on the device is optionally exchanged. The controlling electronic device is then able to evaluate each device management policy to determine an appropriate access level of the file, as previously discussed. If the device management policy present on each of the accessing devices is one such that a particular accessing device is authorized to maintain full access to the file, full access to the file will be maintained to that particular device, and method 500 proceeds to step 512 and the access to the file is not restricted to that particular device. The device management policy is evaluated individually by the controlling electronic device for each accessing device of the plurality of electronic devices, and the access to the file is determined for each device individually.

When optional step 510 is not implemented, or when optional step 510 results in a determination that the device management policy for a particular device is one such that the particular accessing device is not authorized to maintain full access to the file, method 500 proceeds to step 514. At step 514, the controlling electronic device restricts access to the file for at least one of the plurality of electronic devices that are able to access the file. Various levels of restriction of the files can be applied, and may include deletion, encryption, or simply changing permissions of the file. Additional methods of restricting access to a shared file may also be employed for the same purpose. The chosen level of restriction is either pre-determined; i.e. chosen by default, or is determined by optional step 510 as described above.

After step 514, method 500 ends, or optionally, steps 516 and 518 may be implemented. At step 514, the controlling electronic device monitors and detects an establishment of a new connection between the first electronic device and the controlling electronic device. If a new connection is established between the two devices, it is desirable to reinstate access to the previously shared and then restricted file or files. As such, the method proceeds to step 518 and the data store control module reinstates access to the file or files. In embodiments where the file or files have been deleted; the files may be once again synchronized to the shared data store. In this embodiment, the controlling electronic device requests the shared file or files from the first electronic device. In embodiments where the shared file or files have been encrypted, the controlling electronic device will decrypt the shared file or files. In embodiments where the shared file or files have had the associated permissions of the shared file or files changed, for example to read-only, the associated permissions of the file or files will be changed back, for example to read-and-write.

Figure 6:
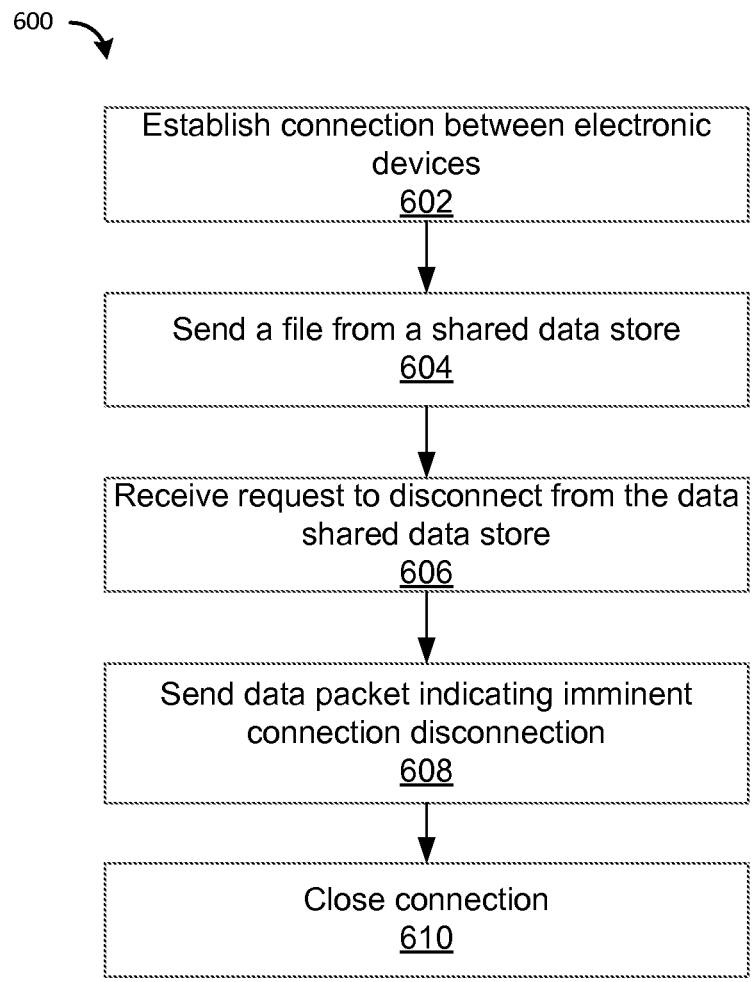
FIG. 6 is a flow chart illustrating an example method performed by an electronic device for sharing a file.

Reference will now be made to FIG. 6, showing a flow chart illustrating an example method 600 performed by a first electronic device for sharing a file with at least one of a plurality of electronic devices by the use of a shared data store, such as shared data store 102 described previously. The electronic device can be one of any number of electronic devices, including but not limited to: cellular telephones (mobile phones), smart telephones (smartphones), Personal Digital Assistants (PDAs), computers, tablet computers, or servers. Method 600 is an example method for supporting an implementation of method 500 as described as described above.

At step 602, a connection is established between the first electronic device and a coordinating electronic device having the shared data store. This connection is similar to the connection established at step 502. Once the connection has been established, at 604 the first electronic device sends a file to be shared to the coordinating electronic device. This establishes a collaboration setting between the two devices.

After the collaboration setting has ended, and the user of the first electronic device wishes to disconnect from the collaboration setting, at step 606, the first electronic device will receive a request to disconnect from the coordinating electronic device. This request is received from the user of the first electronic device, in some embodiments. In other embodiments, it may be determined by the first electronic device after a time-out period for sharing has expired. In yet another embodiment, step 606 is reached when the connection quality between the two devices is determined to be poor, for example, by analysis of the signal-to-noise ratio (SNR) on the communication path. Other alternate implementations may also accomplish the same.

Prior to ending the connection, in this embodiment, the first electronic device sends, at step 608, a data packet over the established connection to the coordinating electronic device. The data packet informs the data store control module of the coordinating electronic device that a connection loss is imminent. This data packet is intended to inform the data store control module to prepare for a connection loss by restricting access to the shared file or files, as explained previously. Following this, at step 610, the first electronic device closes the established connection.

Aspects described above can be implemented as computer executable code modules that can be stored on computer readable media, read by one or more processors, and executed thereon. In addition, separate boxes or illustrated separation of functional elements of illustrated systems does not necessarily require physical separation of such functions, as communications between such elements can occur by way of messaging, function calls, shared memory space, and so on, without any such physical separation. More generally, a person of ordinary skill would be able to adapt these disclosures to implementations of any of a variety of communication devices. Similarly, a person of ordinary skill would be able to use these disclosures to produce implementations and embodiments on different physical platforms or form factors without deviating from the scope of the claims and their equivalents.

What is claimed is:

1. A method performed by a coordinating electronic device capable of controlling access to a shared file by a plurality of electronic devices, the method comprising:
    maintaining a connection with a first electronic device owning a shared file being shared with a second electronic device;
    extending access to the shared file to the second electronic device by:
        receiving the shared file via the connection, wherein the shared file is received from the first electronic device, and storing the shared file in a shared data store at the coordinating electronic device, the shared data store accessible by the second electronic device;
    detecting a loss of the connection between the coordinating electronic device and the first electronic device in response to determining that the coordinating electronic device did not receive an expected keep-alive communication from the first electronic device; and
    in response to detecting the loss of the connection, restricting access to the shared file by the second electronic device, wherein restricting access to the shared file comprises deleting the shared file from the shared data store.

2. The method of claim 1, wherein restricting access to the shared file comprises setting permissions associated with the shared file to read-only for the second electronic device.

3. The method of claim 1, wherein restricting access to the shared file comprises encrypting the file.

4. The method of claim 1, further comprising:
    after detecting the loss of connection to the first electronic device, detecting an establishment of a new connection to the first electronic device; and
    in response to the detecting the establishment of the new connection, reinstating access to the shared file by the second electronic device.

5. The method of claim 4, wherein reinstating access to the shared file comprises setting permissions associated with the shared file to read/write for the second electronic device.

6. The method of claim 4, wherein reinstating access to the shared file comprises decrypting the shared file.

7. The method of claim 1, further comprising:
for each of the plurality of electronic devices, determining whether a device management policy is present; and
evaluating the device management policy to determine an access level associated with the shared file.

8. The method of claim 1, wherein detecting the loss of the connection to the first electronic device includes receiving a data packet from the first electronic device indicating the loss of the connection.

9. The method of claim 1, wherein the coordinated electronic device is at least one of a mobile communication device or a data server.

10. A coordinating electronic device capable of controlling access to a shared file by a plurality of electronic devices, the coordinating electronic device comprising:
a communications component capable of monitoring a connection with a first electronic device, the first electronic device associated with sharing a shared file with a second electronic device; and
a data store control module configured to extend access to the shared file to the second electronic device by:
receiving the shared file via the connection, wherein the shared file is received from the first electronic device, and
storing the shared file in a shared data store at the coordinating electronic device, the shared data store accessible by the second electronic device,
detect a loss of the connection between the coordinating electronic device and the first electronic device in response to determining that the coordinating electronic device did not receive an expected keep-alive communication from the first electronic device, and
restrict access to the shared file by the second electronic device in response to detecting the loss of the connection including deleting the shared file from the shared data store.

11. The coordinating electronic device of claim 10, wherein the data store control module is further configured to set permissions associated with the shared file to read-only for the second electronic device to restrict access to the shared file.

12. The coordinating electronic device of claim 10, the data store control module is further configured to encrypt the file to restrict access to the shared file.

13. The coordinating electronic device of claim 10, the data store control module is further configured to
for each of the plurality of electronic devices, determine whether a device management policy is present, and
evaluate the device management policy to determine an access level associated with the shared file.

14. The coordinating electronic device of claim 10, the data store control module is further configured to receiving a data packet from the first electronic device indicating the loss of the connection.

15. The coordinating electronic device of claim 10, wherein the coordinating electronic device is at least one of a mobile communication device or a data server.

16. A non-transitory computer readable storage medium storing program computer executable instructions for executing an application on a coordinating electronic device for controlling access to a shared file by a plurality of electronic devices, wherein execution of the instructions by a processor of the coordinating electronic device causes the processor to:
maintain a connection with a first electronic device owning a shared file being shared with a second electronic device;
extend access to the shared file to the second electronic device by:
receiving the shared file via the connection, wherein the shared file is received from the first electronic device, and
storing the shared file in a shared data store at the coordinating electronic device, the shared data store accessible by the second electronic device;
detect a loss of the connection between the coordinating electronic device and the first electronic device in response to determining that the coordinating electronic device did not receive an expected keep-alive communication from the first electronic device; and
restrict access to the shared file by the second electronic device in response to detecting the loss of the connection, wherein restricting access to the shared file comprises deleting the shared file from the shared data store.

* * * * *